United States Patent
Chiu et al.

(10) Patent No.: US 10,859,751 B1
(45) Date of Patent: Dec. 8, 2020

(54) BACKLIGHT MODULE HAVING A LIGHT GUIDE WITH A PLURALITY OF MICROSTRUCTURE GROUPS AND PRIMS CONNECTED THERE BETWEEN

(71) Applicant: Darwin Precisions Corporation, Hsinchu County (TW)

(72) Inventors: Yu-Huan Chiu, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 16/737,102

(22) Filed: Jan. 8, 2020

(30) Foreign Application Priority Data

Aug. 30, 2019 (TW) .............................. 108131425 A (51) Int. Cl.
F21V 8/00 (2006.01)
(52) U.S. Cl.
CPC ......... *G02B 6/0036* (2013.01); *G02B 6/0061* (2013.01); *G02B 6/0065* (2013.01); *G02B 6/0068* (2013.01)
(58) Field of Classification Search
CPC ... G02B 6/0036; G02B 6/0038; G02B 6/0061
See application file for complete search history.

(56) References Cited

U.S. PATENT DOCUMENTS

| 7,833,621 | B2 | 11/2010 | Jones et al. | |
|---|---|---|---|---|
| 8,186,867 | B2* | 5/2012 | Chen | G02B 6/0036 362/623 |
| 2002/0054488 | A1 | 5/2002 | Ohkawa | |
| 2012/0147472 | A1 | 6/2012 | Kajiya et al. | |
| 2015/0131317 | A1* | 5/2015 | Yuki | G02B 6/0055 362/610 |

FOREIGN PATENT DOCUMENTS

| CN | 106501895 A | 3/2017 |
|---|---|---|
| TW | 561089 | 11/2003 |
| TW | 200705044 A | 2/2007 |

(Continued)

*Primary Examiner* — Robert J May
(74) *Attorney, Agent, or Firm* — WPAT, PC (57) ABSTRACT

A backlight module including a plurality of first light-emitting devices and a light guide plate is provided. The light guide plate includes light-emitting surface, bottom surface and a first light-receiving side. The bottom surface is corresponded to the light-emitting surface, and the first light-receiving side connects the light-emitting surface and the bottom surface. The first light-emitting devices are disposed on the first light-receiving side, arranged along a first direction. The light guide plate further includes a plurality of prisms and a plurality of microstructure groups. The prisms are disposed on the bottom surface and extend along the first direction. The microstructure group includes microstructures, and the microstructures are respectively connecting two of the prisms adjacently disposed. Each of the microstructures has a ridgeline, and the ridgeline is parallel to a second direction, which is different from the first direction. A manufacture method of a light guide plate is also provided.

13 Claims, 9 Drawing Sheets

(56) References Cited

FOREIGN PATENT DOCUMENTS

| TW | I3077918 | 3/2009 |
|---|---|---|
| TW | I3127298 | 8/2009 |
| TW | 201035608 A1 | 10/2010 |
| TW | I5226638 | 2/2016 |
| TW | I5280878 | 4/2016 |

* cited by examiner

BACKLIGHT MODULE HAVING A LIGHT GUIDE WITH A PLURALITY OF MICROSTRUCTURE GROUPS AND PRIMS CONNECTED THERE BETWEEN

CROSS-REFERENCE TO RELATED APPLICATION

This application claims priority to Taiwan Application Serial Number 108131425, filed Aug. 30, 2019, which is herein incorporated by reference in its entirety.

BACKGROUND

Field of Disclosure

The present disclosure is related to an optical device and a manufacturing method of an optical module, especially a backlight module and a manufacturing method of a light guide plate.

Description of Related Art

As technology continues to develop, the application of display devices, such as liquid crystal displays, has been widely applied in human life. However, due to the fact that a liquid crystal display needs a backlight to provide a light source, how to manufacture a backlight device with a more proper surface light source is one of the problems that need to be solved for person having ordinary skill in the art.

The existing device such as edge-lit type backlight uses a light guide plate to transmit light, and some backlights can even make use of structures at bottom surface of light guide plate to enhance the directivity of surface light source provided by the backlights. However, the disposition of these structures such as a V-cut structure may produce extra patterns, and over-sized structures may even cause pictures provided by display device to emerge corresponding patterns, and this has thus become another problem that needs to be solved for the person having ordinary skills in the art.

SUMMARY

The present disclosure relates in general to a backlight module and a manufacturing method of a light guide plate.

According to an embodiment of the present disclosure, a backlight module has light-emitting devices and light guide plate. The light guide plate has a light-emitting surface, a bottom surface and a first light-receiving side. The bottom surface is disposed opposite to the light-emitting surface, and the first light-receiving side connects the light-emitting surface and the bottom surface, and the light-emitting devices are disposed on the first light-receiving side along a first direction. The light guide plate further includes prisms and microstructure groups. The prisms are disposed on the bottom surface. The microstructure groups include microstructures, and the microstructures respectively connect two of the prisms adjacently disposed. Each of the microstructures has a ridgeline. The prisms extend along the first direction, and the ridgelines of the microstructures are parallel to a second direction, which is different from the first direction.

According to an embodiment of the present disclosure, a manufacturing method of a light guide plate includes providing a first substrate having a processing plane; cutting the processing plane of the first substrate with a first cutting tool along the first direction, leaving the first molding trenches; cutting the processing plane having the first molding trenches of the first substrate with a second cutting tool along a second direction, leaving second molding trenches; and molding a bottom surface of the light guide plate using the processing plane. The first molding trenches are adjacent to each other. The second molding trenches are spaced apart from each other, and the second direction differs from the first direction.

As seen from the above, light-emitting efficiency of the light guide plate of the backlight module in the embodiment of the present disclosure can be enhanced by the prisms on the bottom surface, whereas the microstructure groups on the bottom surface can avoid the surface light source provided by the light-emitting surface emerging patterns corresponded to the prisms, so as to improve directivity and uniformity of the surface light source. As the light guide plate provided by the manufacturing method of the light guide plate in the embodiment of the present disclosure applies to the backlight module, surface light source with more proper uniformity and directivity can be provided.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The backlight module of an embodiment of the present disclosure including a light guide plate can be applied to a display device. For example, the backlight module of the embodiment of the disclosure can be applied to liquid crystal display (LCD) or thin film transistor LCD (TFT-LCD), but the present disclosure is not limited to the applications or techniques in the field of backlight modules.

Although the terms first, second, etc. may be used herein to describe various elements, components, or parts, these elements, components, or parts should not be limited by these terms. These terms are only used to distinguish one element, component, or part from another. For example, a first element, a first component, or a first part could be termed a second element, a second component, or a second part, without departing from the scope of example embodiments.

In the figures, the thickness of layers, films, panels, regions, etc., are exaggerated for clarity. Throughout the specification, the same reference numerals denote the same component. It will be understood that when a component such as a layer, a film, a region or a substrate is referred to as "on" or "connected to" another component, intermediate components can also be present. In contrast, when a component is referred to as "directly on" or "directly connected to" another component, no intermediate component can be present. As used herein, "connected" may refer to both physical and/or electrical connections. Furthermore, "electrical connection" or "coupled" may be the presence of other components between two elements.

Figure 1A:
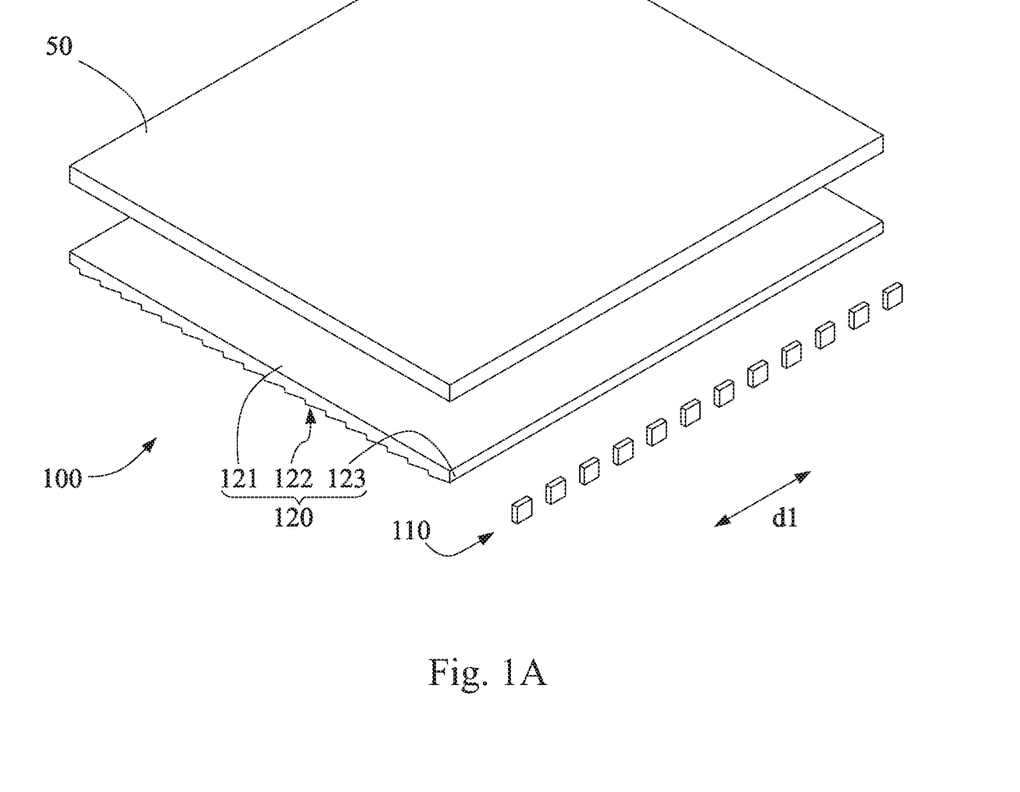
FIG. 1A is a schematic perspective exploded view of backlight module and a display panel of an embodiment of the present disclosure.

FIG. 1A is a schematic view of a backlight module and a display panel of an embodiment of the present disclosure. Please refer to FIG. 1A, in the embodiment of the present disclosure; the backlight module 100 includes a plurality of first light-emitting devices 110 and light guide plate 120.

For example, the first light-emitting devices 110 can include such as light-emitting diodes (LED) or laser diodes (LD), but the present disclosure is not limited thereto.

In the embodiment, the light guide plate 120 includes light-emitting surface 121, bottom surface 122 and first light-receiving side 123. The bottom surface 122 is disposed opposite to the light-emitting surface 121, and the bottom surface 122 and the light-emitting surface 121 are disposed back to back, and the first light-receiving side 123 connects the light-emitting surface 121 and the bottom surface 122. The first light-emitting devices 110 are located at the first light-receiving side 123, and the first light-emitting devices 110 are arranged along a first direction d1.

For example, the light guide plate 120 of the embodiment can be placed under a display panel 50, and the light-emitting surface 121 of the light guide plate 120 faces the display panel 50. The light provided by the first light-emitting devices 110 of the backlight module 100 can enter the light guide plate 120 from the first light-receiving side 123, allowing the light guide plate 120 to provide a surface light source at the light-emitting surface 121 to the display panel 50.

Figure 1B:
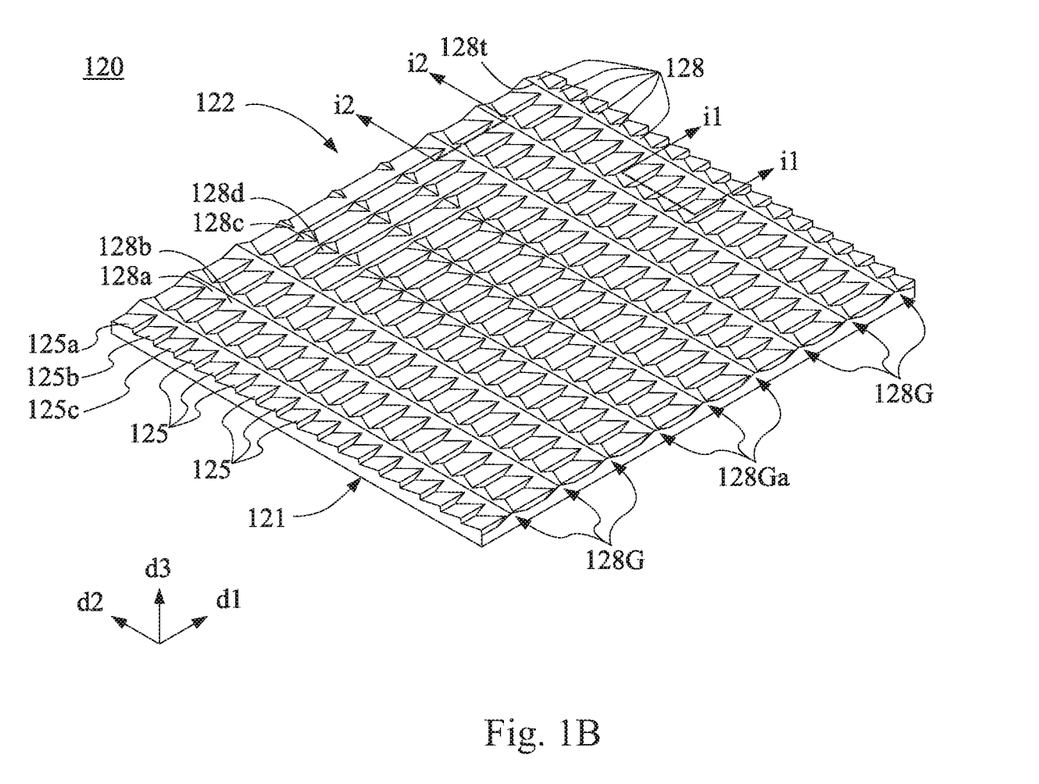
FIG. 1B is a schematic perspective view of light guide plate of an embodiment of the present disclosure.

Please refer to FIG. 1B, which is a schematic perspective view of the light guide plate 120 of the embodiment of the disclosure from another perspective, and FIG. 1B is showing the schematic perspective view while the bottom surface 122 of the light guide plate 120 facing up. In the embodiment, the light guide plate 120 further includes prisms 125 and microstructure groups 128G. The prisms 125 are disposed on the bottom surface 122, and the prisms 125 extend along the first direction d1.

Each of the microstructure groups 128G of the embodiment contains microstructures 128. The microstructures 128 connect the two adjacently disposed prisms 125; respectively. For instance, the microstructure 128a connects to the prism 125a and the prism 125b, whereas the microstructure 128b connects to the prism 125b and the prism 125c.

Each of the microstructures 128 of the embodiment has a ridgeline 128t, and the ridgelines 128t of the microstructures 128 are parallel to second direction d2, and the second direction d2 is different from the first direction d1.

To specified, in FIG. 1B and the figures referred by the following content, the prisms 125 on the bottom surface 122 and the microstructures 128 of the microstructure groups 128G are drawn in magnification to illustrate relative positions of the components, and it is not used to limit the actual sizes and positions of the components in the embodiment of the present disclosure.

Please refer to both FIG. 1A and FIG. 1B, in the backlight module 100 of the embodiment, as the first light-emitting device 110 provides light to the light guide plate 120, the prisms 125 on the bottom surface 122 can control light-emitting angle of the light emitted from the light-emitting surface 121 effectively. The microstructures 128 of the microstructure groups 128G are further distributed on the prisms 125, allowing the uniformity of the surface light source provided by the light-emitting surface 121 to be further enhanced, so as to avoid the surface light source emerging patterns corresponding to the prisms 125 in any partial area.

On the other hand, because the bottom surface 122 of the embodiment are disposed with both the prisms 125 and the microstructure groups 128G, the light provided from the light-emitting surface 121 of the backlight module 100 has high directivity. For example, as the display panel 50 forming image by the surface light source provided from the backlight module 100, because the light provided by the backlight module 100 has high directivity, the brightness and contrast of image are with higher quality, and graphic in the image can be presented clearly without emerging extra patterns, and bright or dark spots.

To be explicit, in the embodiment, the microstructures 128 of the microstructure groups 128G may be or may not be connected to each other. For example, microstructure 128a of the embodiment connects to microstructure 128b, whereas microstructure 128c is not connected to the microstructure 128d, which is adjacent to the microstructure 128c.

At the same time, on third direction d3 being parallel to normal direction of the light-emitting surface 121, the heights of the microstructures 128a and 128b are higher than the adjacent prisms 125a-125c, whereas the heights of the microstructures 128c and 128d are not higher than the adjacent prisms 125a-125c. Thus, the microstructures 128 can be distributed on the bottom surface 122, and the heights of the microstructures 128 and the connecting conditions in between the microstructures 128 can be adjusted according to different positions, so as to further provide a more proper light adjustment effect on different positions of the light guide plate 120.

On the other hand, in the embodiment, the ridgelines 128t of the microstructures 128 of each of the microstructure groups 128G are arranged along a straight line, and two of the microstructures 128 adjacently disposed may be or may not be connected to each other. The ridgelines 128t of the microstructures 128 are parallel to the second direction d2, and the first direction d1 of the embodiment is perpendicular to the second direction d2, but the present disclosure is not limited thereto. In other embodiment of the present disclosure, the angle between the first direction d1 and the second direction d2 can be in other degrees.

Please refer to FIG. 1B, in each of the microstructure groups 128G, the ridgelines 128t of the microstructures 128 can be perpendicular to the normal direction (i.e. the third direction d3) of the light-emitting surface 121, but can also be gradually close to or away from the light-emitting surface 121. In other words, in the embodiment of the present disclosure, the straight line arranged by the ridgelines 128t of the microstructures 128 of different microstructure groups 128G and the normal of the light-emitting surface 121 can be intersected in different angles. For instance, in the microstructure groups 128Ga (take three for example), the heights of the microstructures 128 of each microstructure groups 128Ga on the normal direction (i.e. the third direction d3) of the light-emitting surface 121 can increase or decrease along the second direction d2.

Figure 2A:
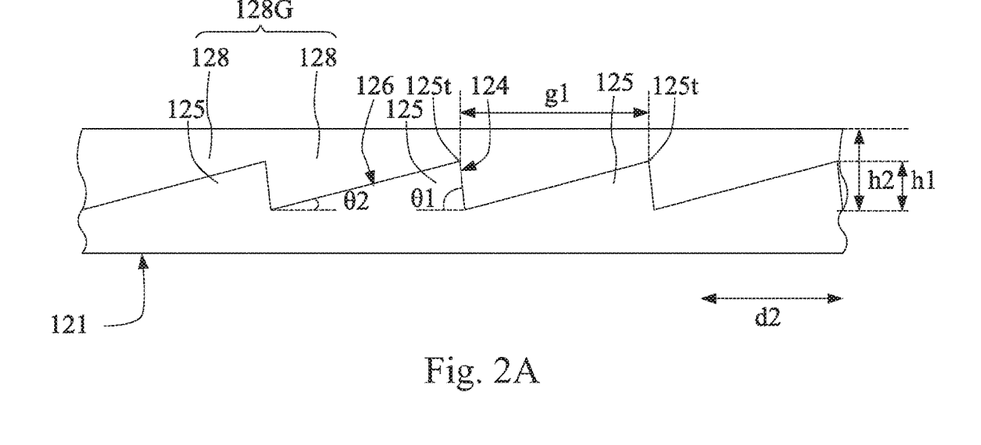
FIG. 2A is a schematic sectional view taken along cutting-plane line i1 in FIG. 1B.

Please refer to FIG. 2A; FIG. 2A is the schematic sectional view taken along cutting-plane line i1 in FIG. 1B. In the embodiment of the present disclosure, the prisms 125 can have a plane 124 and a plane 126 connected to each other, and the prisms 125 can have a triangular section, and an included angle 81 between the plane 124 and the light-emitting surface 121 is bigger than an included angle 82 between the plane 126 and the light-emitting surface 121. Corresponding to the first light-receiving side 123 (see FIG. 1A) of the light guide plate 120, the plane 124 and plane 126 of every prism 125 provide proper reflection effect. For instance, in the embodiment of the present disclosure, the angle of the included angle 81 can fall within the range between 60 degrees to 90 degrees, whereas the angle of the included angle 82 can be within the range no more than 15 degrees, but the present disclosure is not limited thereto.

On one other hand, gap g1 between every two ridgelines 125t of the prisms 125 on the second direction d2 falls within the range between 55 and 65 micrometer (μm). To be specific, the gaps g1 between the ridgelines 125t of the prisms 125 of the embodiment can change along the position, so as to adjust the distribution of the prisms 125 on the light guide plate 120.

On the other hand, the heights h1 of the prisms 125 of the embodiment of the present disclosure can change according to the position as well, and the prisms 125 can provide proper reflection effect corresponded to the position of the first light-receiving side 123 (see FIG. 1A). At the same time, structural height ratio of the light guide plate 120 of the embodiment in the area is bigger than one. To specified, in the embodiment and the following embodiments, the structural height ratio is the maximum value of the ratios of height h2 of the microstructure 128 to height h1 of the adjacent two prisms 125 in the normal direction of the light-emitting surface 121. In other words, the height h2 of the microstructure 128 is higher than the height h1 of the prisms 125. The structural height ratio of another partial area of the light guide plate 120 can be less than one, that is, the height h2 of the microstructure 128 can be less than the height h1 of the prisms 125. The structural height ratio of another partial area of the light guide plate 120 can equal to one, that is, the height h2 of the microstructures 128 can equal to the height h1 of the prisms 125. In other words, among each of the microstructure groups 128G of the embodiment of the present disclosure, the height h2 of the ridgelines 128t of each microstructure 128 on the normal direction of the light-emitting surface 121 is higher or less than the height h1 of the two adjacent prisms 125 on the normal direction of the light-emitting surface 121.

Figure 2B:
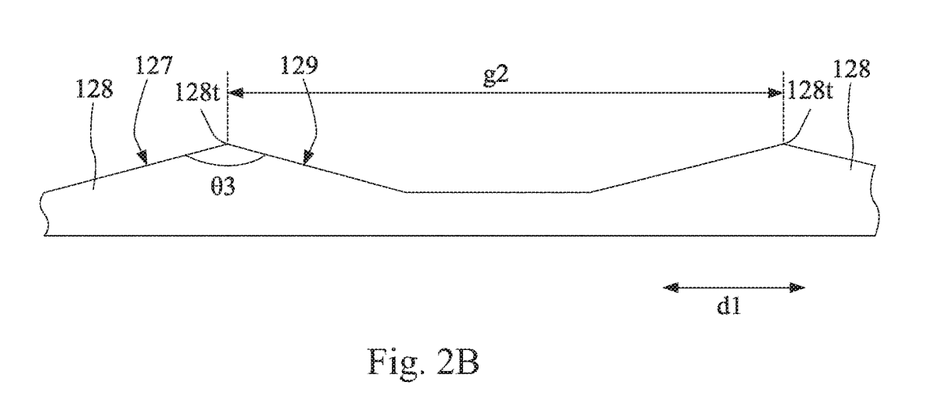
FIG. 2B is a schematic sectional view taken along cutting-plane line i2 in FIG. 1B.

Please refer to FIG. 2B, which is the schematic partial sectional view of the light guide plate 120 taken along the first direction d1 of an embodiment of the present disclosure, and the schematic sectional view is taken, for example, along the cutting-plane line i2 of FIG. 1B. In the embodiment of the present disclosure, gaps g2 between the microstructures 128 along the first direction d1 falls within the range of 10 to 150 micrometer. To be explicit, the gaps g2 of the microstructures 128 of the embodiment on the first direction d1 can change along the position, so as to adjust the distribution of the microstructures 128.

Figure 2C:
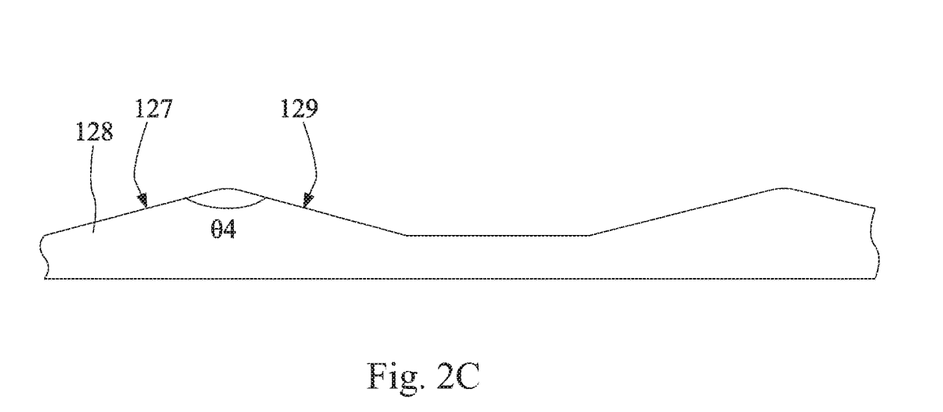
FIG. 2C is a schematic partial sectional view of a light guide plate taken along first direction in another embodiment of the present disclosure.

In the embodiment of the present disclosure, the microstructure 128 includes first plane 127 and second plane 129, and there is a sharp angle 83 between the first plane 127 and the second plane 129, but the present disclosure is not limited thereto. Please refer to FIG. 2C, which is the schematic partial sectional view of the light guide plate taken along the first direction in another embodiment of the present disclosure. In the embodiment, there is a round angle 84 between the first plane 127 and the second plane 129 of the microstructure 128.

Figure 3A:
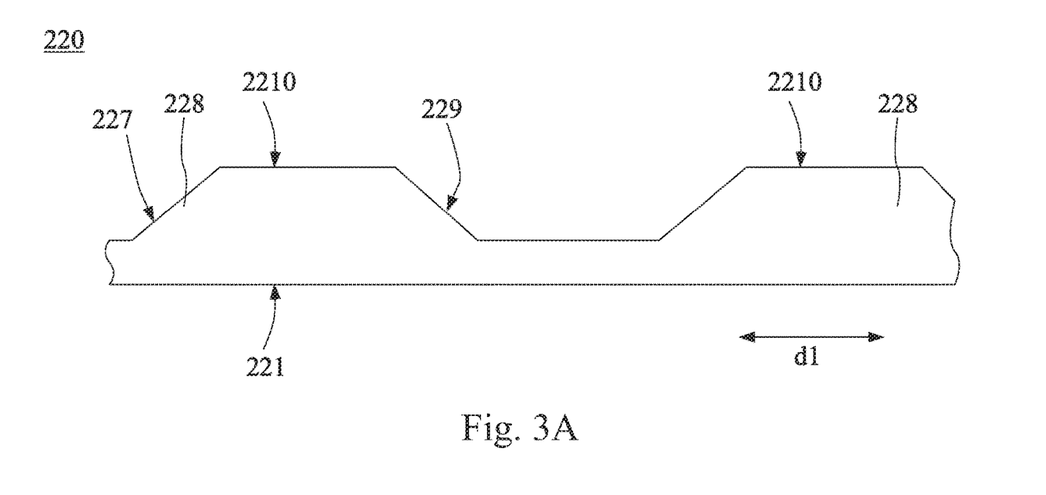
FIG. 3A is a schematic partial sectional view of a light guide plate taken along the first direction of still another embodiment of the present disclosure.

Please refer to FIG. 3A, which is the schematic partial sectional view of light guide plate 220 taken along the first direction d1 in still another embodiment of the present disclosure. The light guide plate 220 of the embodiment is similar to the light guide plate 120 of the aforementioned embodiment, and description about the identical components will not be elaborated here. The difference is that microstructure 228 of the embodiment of the present disclosure includes first plane 227, second plane 229 and third plane 2210 connecting the first plane 227 and the second plane 229. In the embodiment, the third plane 2210 of the microstructure 228 can be parallel to the light-emitting surface 221, and the third plane 2210 of another microstructure 228 can be an inclined plane corresponding to the light-emitting surface 221, but the present disclosure is not limited thereto.

On the other hand, the first plane 227 and the second plane 229 of the embodiment are inclined planes corresponding to the light-emitting surface 221, but the present disclosure is not limited thereto. Please refer to FIG. 3B, which is the schematic partial sectional view of light guide plate 320 taken along the first direction d1 of yet another embodiment of the present disclosure. First plane 327 and second plane 329 of the microstructure 328 of the light guide plate 320 are perpendicular to light-emitting surface 321. In other words, in the embodiment of the present disclosure, the microstructure 328 includes the first plane 327, the second plane 329 and third plane 3210 connecting to the first plane 327 and the second plane 329, and the first plane 327 and the second plane 329 are vertical planes corresponding to the light-emitting surface 321.

Figure 4A:
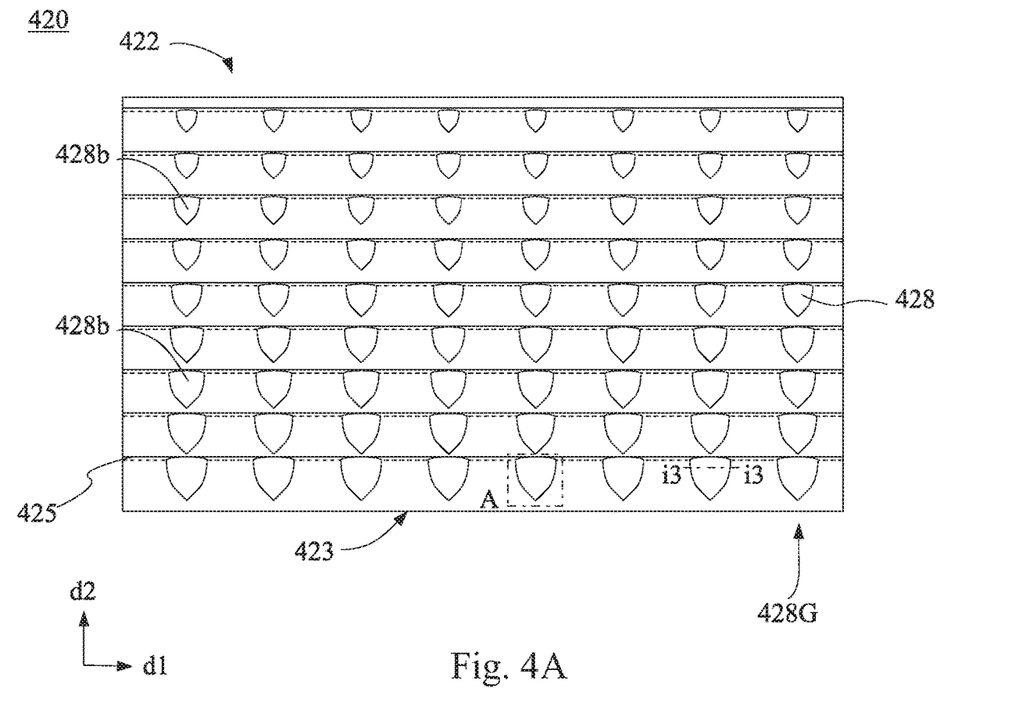
FIG. 4A is a schematic plain view of the light guide plate of still another embodiment of the present disclosure.

Please refer to FIG. 4A, which is the schematic plain view of light guide plate of still another embodiment of the present disclosure, and the perspective of FIG. 4A is facing the bottom surface of the light guide plate. On the bottom surface, ridgelines are indicated by solid lines and valley lines are indicated by dotted lines in FIG. 4A. In the embodiment of the present disclosure, light guide plate 420 is similar to the light guide plate 320 of the aforementioned embodiment, and description of the identical components will not be elaborated here. The difference in the embodiment is that each of microstructures 428 of microstructure groups 428G have a curved surface.

To be specific, the light guide plate 420 of the embodiment has first light-receiving side 423 and bottom surface 422. Prisms 425 extending along the first direction d1 and microstructure groups 428G are disposed on the bottom surface 422. Among each of the microstructure groups 428G, the heights of microstructures 428 decreases along second direction d2 starting from the first light-receiving side 423.

Figure 4B:
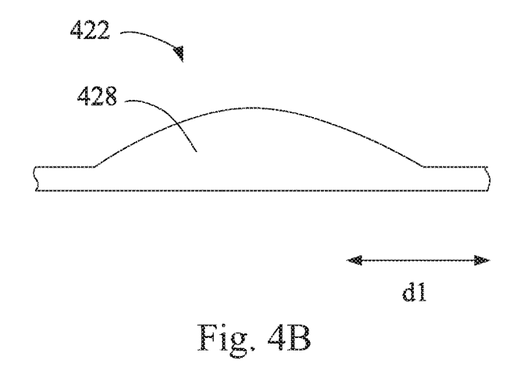
FIG. 4B is a schematic sectional view according to cutting-plane line i3 in FIG. 4A.
Figure 4C:
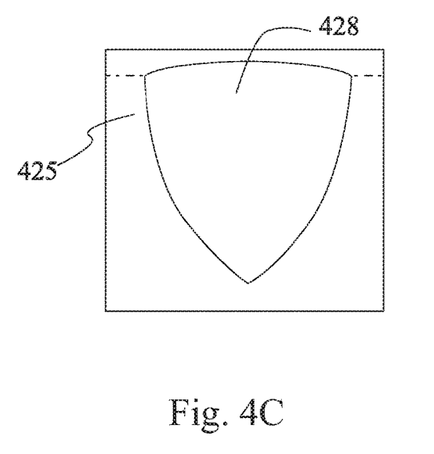
FIG. 4C is a schematic partial magnified view according to area A in FIG. 4A.

Please refer to FIG. 4B, which is the schematic sectional view taken along cutting-plane line i3 in FIG. 4A. In the embodiment of the present disclosure, the microstructure 428 is disposed on the bottom surface 422 and has curved surface. Please refer to FIG. 4C, which is the schematic partial magnified view drawn according to area A in FIG. 4A. In the embodiment, since the microstructure 428 has curved surface, the edge where microstructure 428 connects to prism 425 is also curved, so that the light guide plate 420 can provide surface light source with more proper directivity.

Figure 5A:
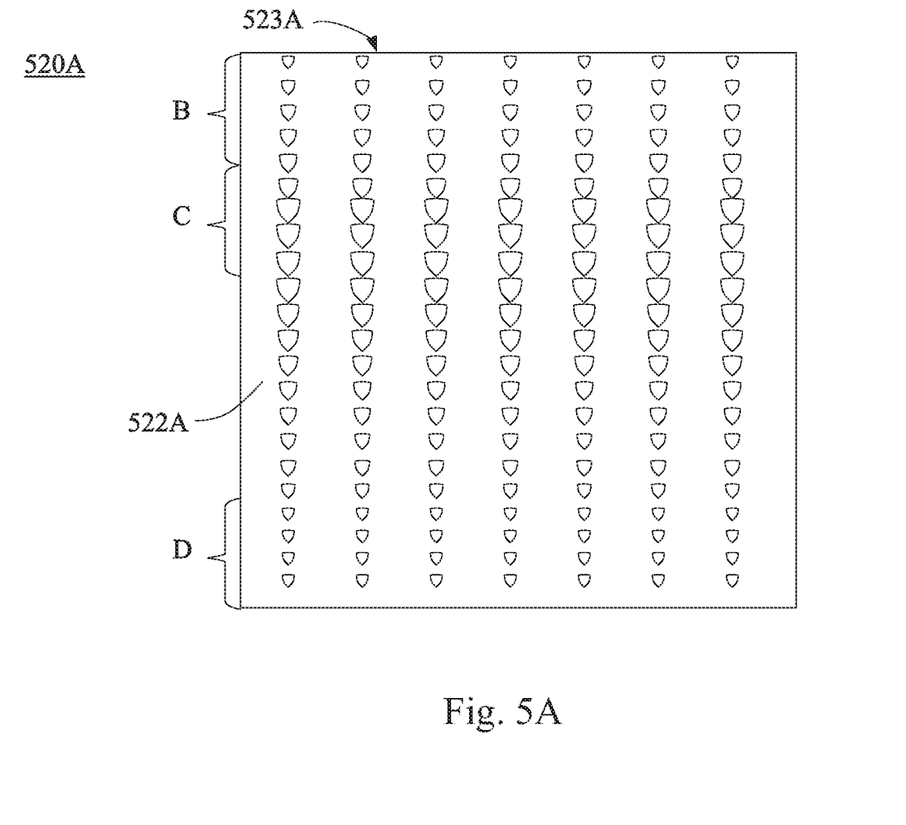
FIG. 5A is a schematic view of a light guide plate of an embodiment of the present disclosure.

Please refer to FIG. 5A, which the schematic view of light guide plate of an embodiment of the present disclosure, and to explain more clearly, prisms on the top are omitted in FIG. 5A. In the embodiment, light guide plate 520A is similar to the light guide plate of the aforementioned embodiment, and the light guide plate 520A includes first light-receiving side 523A and bottom surface 522A, and since prism and microstructure groups of the light guide plate 520A are similar to the foresaid light guide plate 420, they will not be further described here. The light guide plate 520A of the embodiment further includes first area B, second area C and third area D. The distance between the first area B and the first light-receiving side 523A is less than that of the third area D and the first light-receiving side 523A, and the second area C is located between the first area B and the third area D.

In the embodiment of the present disclosure, the structural height ratio of the first area B is less than that of the second area C, and the structural height ratio of the third area D is less than that of the second area C. With the distribution as such, microstructure group of the light guide plate 520A can avoid bright spots, dark spots or other uneven patterns emerging as the light guide plate 520A is used to provide a surface light source.

Figure 5B:
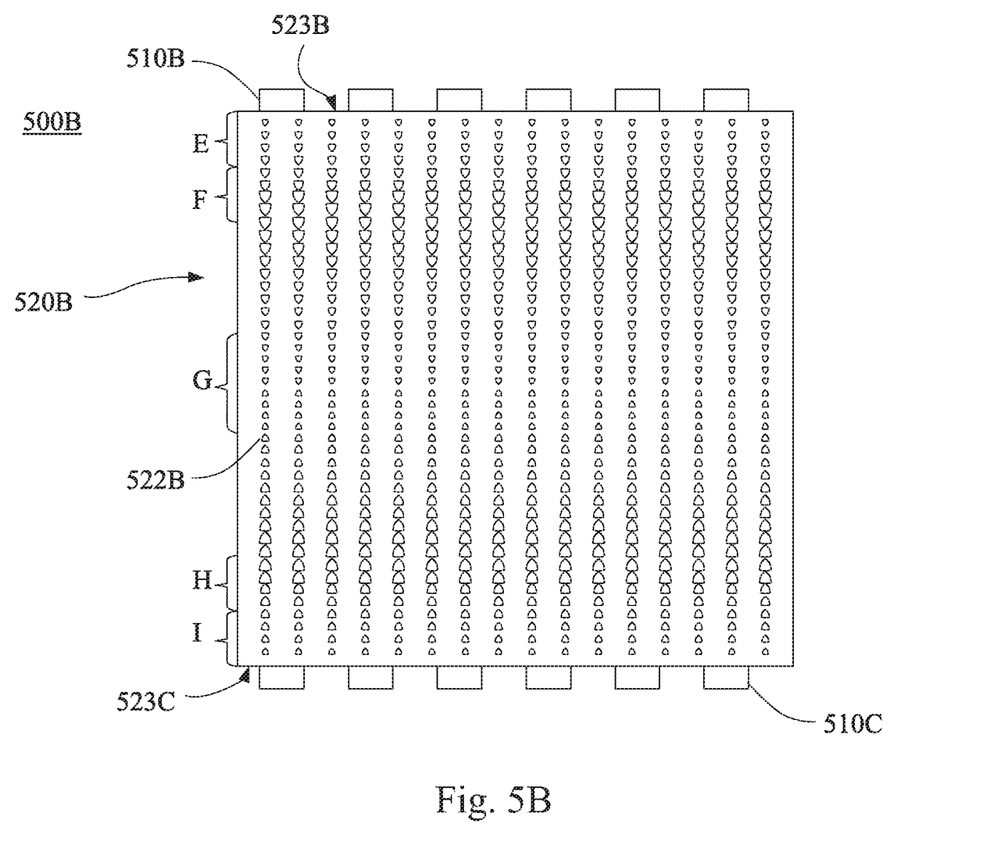
FIG. 5B is a schematic view of a backlight module of another embodiment of the present disclosure.

FIG. 5B is a schematic view of backlight module of another embodiment of the present disclosure. Please refer to FIG. 5B, backlight module 500B of the embodiment includes first light-emitting device 510B and light guide plate 520B. The light guide plate 520B is similar to the foresaid light guide plate 520A, so the description of the same component will not be further elaborated here. The difference is that the backlight module 500B further includes second light-emitting devices 510C, and the light guide plate 520B further includes second light-receiving side 523C. The second light-receiving side 523C, which is similar to the first light-receiving side 523B, is connected to the bottom surface 522B and the light-emitting surface (not shown in FIG. 5B) corresponded to the bottom surface 522B, and the second light-receiving side 523C is disposed opposite to the first light-receiving side 523B.

In the embodiment of the present disclosure, the light guide plate 520B includes first area E, second area F, third area G, fourth area H and fifth area I. Distance between the first area E and the first light-receiving side 523B is less than distance between the third area G and the first light-receiving side 523B, and the second area F is located between the first area E and the third area G. On the other hand, distance between the fifth area I and the second light-receiving side 523C is less than distance between the third area G and the second light-receiving side 523C, and the fourth area H is located between the third area G and the fifth area I.

In the light guide plate 520B of the embodiment, both structural height ratio in the first area E and structural height ratio in the third area G are less than structural height ratio in the second area F, that is, the height of microstructure on the normal direction of light-emitting surface in the second area F is higher than the height of microstructure in the first area E as well as the height of microstructure in the third area G.

On the other hand, in the light guide plate 520B of the embodiment of the present disclosure, both structural height ratio in the fifth area I and the structural height ratio in the third area G are less than structural height ratio in the fourth area H, that is, the height of microstructure on the normal direction of light-emitting surface in the fourth area H is higher than the height of microstructure in the third area G as well as the height of microstructure in the fifth area I.

Figure 6:
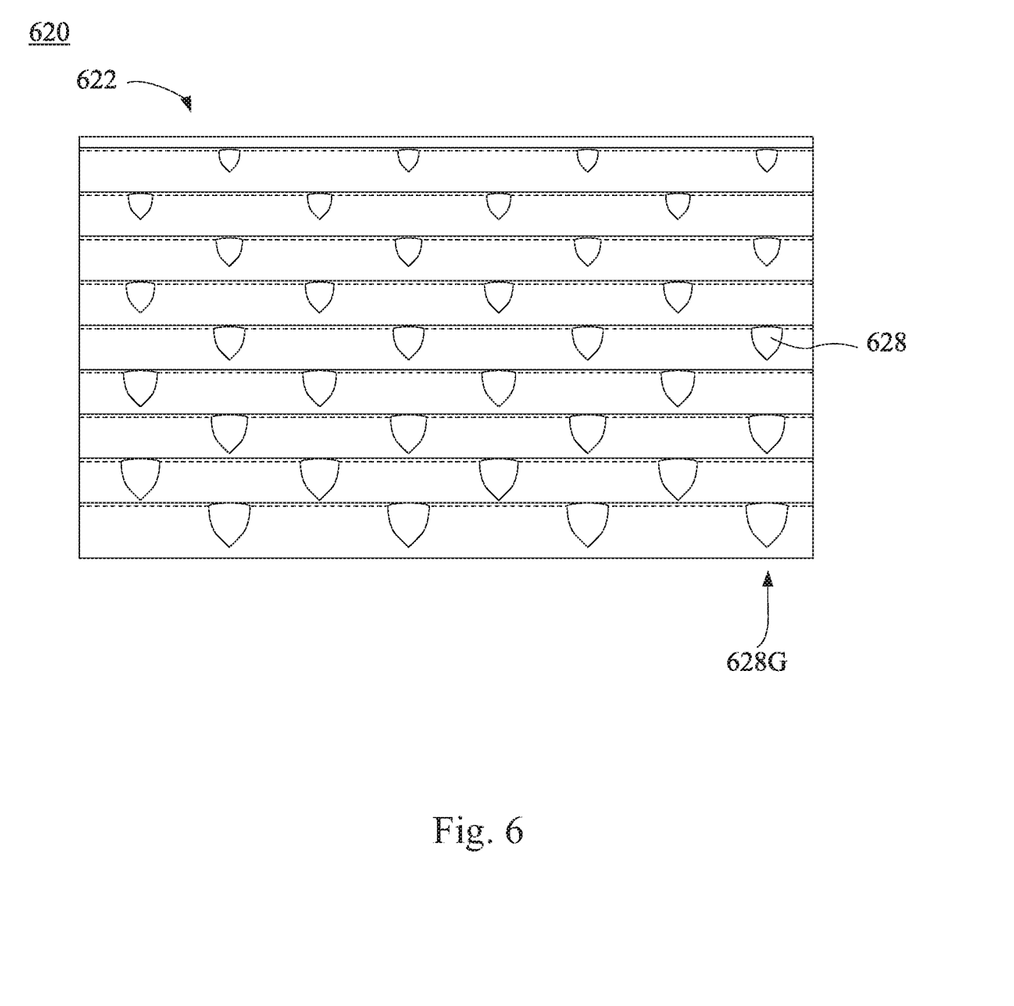
FIG. 6 is a schematic view of a light guide plate of still another embodiment of the present disclosure.

Please refer to FIG. 6, which is the schematic view of light guide plate of still another embodiment of the present disclosure. In the embodiment, the light guide plate 620 includes microstructure groups 628G disposed on bottom surface 622, and adjacent microstructures 628 of the microstructure groups 628G are arranged in alternative manner. The light guide plate 620 of the embodiment can be formed, for example, by placing a substrate with processing plane and molding trenches which corresponding to prisms on roller, and cutting the processing plane of the substrate on the roller when rolling along a thread-like path. Thereby, a mold which can form bottom surface 622 of light guide plate 620 can be provided and forms the bottom surface 622 of light guide plate 620 by molding.

Figure 7:
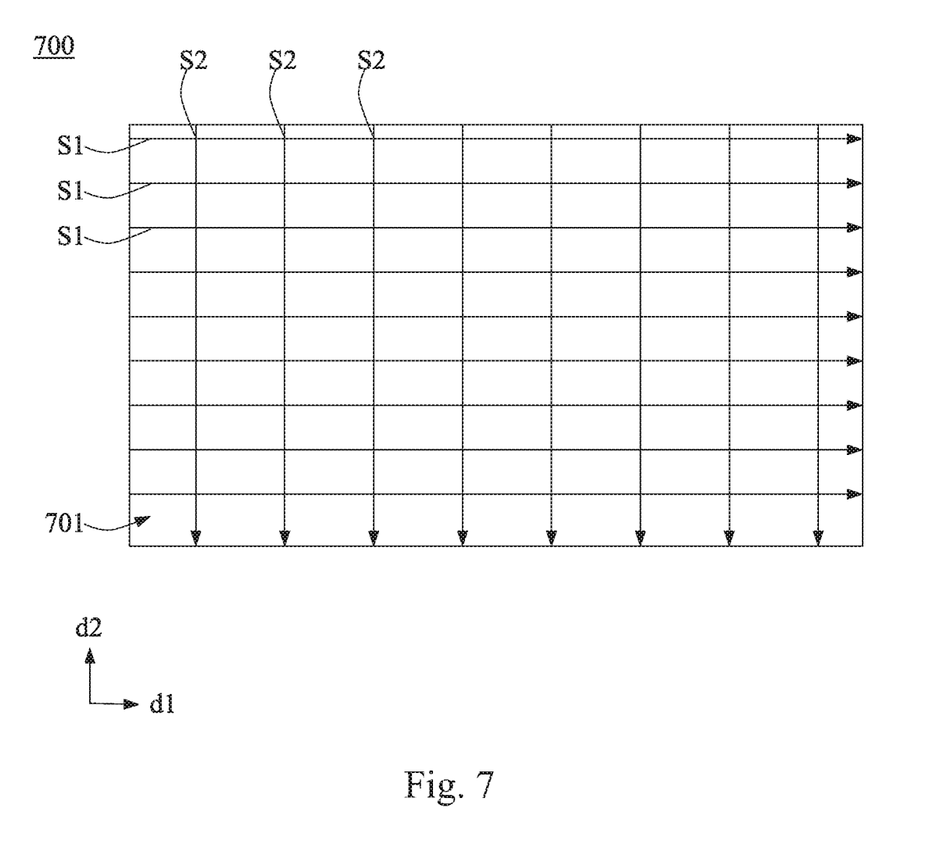
FIG. 7 is a schematic view of first substrate of yet another embodiment of the present disclosure.

Please refer to FIG. 7 which is the schematic view of first substrate of yet another embodiment of the present disclosure. First substrate 700 has processing plane 701. The manufacturing method of the embodiment is cutting first molding trenches on the processing plane 701 by a first cutting tool along the first direction d1, and the first molding trenches are adjacent to each other. To be precise, the contour of the first cutting tool is, for example, similar to a section of the aforementioned prism 125, while cutting the processing plane 701 along paths S1. Also, the method of the embodiment allows the gap between the paths S1 to not exceed the width of the first tool, so that the first molding trenches can be adjacent to each other.

Then, the manufacture method of the embodiment of the present disclosure uses a second cutting tool to cut second molding trenches on the processing plane having the first molding trenches along the second direction d2. The second molding trenches have gaps, that is, when the second cutting tool cuts the processing plane 701 along paths S2, the gap between paths S2 exceeds the width of the second cutting tool cutting the processing plane 701. For instance, the gap of the second molding trenches can fall within the range from 10 micrometer to 150 micrometer.

In the embodiment of the present disclosure, the first direction d1 is perpendicular to the second direction d2, but the present disclosure is not limited thereto. In other embodiments of the present disclosure, the angle between the first direction d1 and the second direction d2 can be in other degrees.

Please refer to FIG. 7, by the aforementioned method, the processed processing plane 701 of the first substrate 700 can manufacture the bottom surface 122 having prisms 125 and microstructure groups 128G of light guide plate (the light guide plate 120 for example) of the aforementioned embodiment by molding.

Figure 3B:
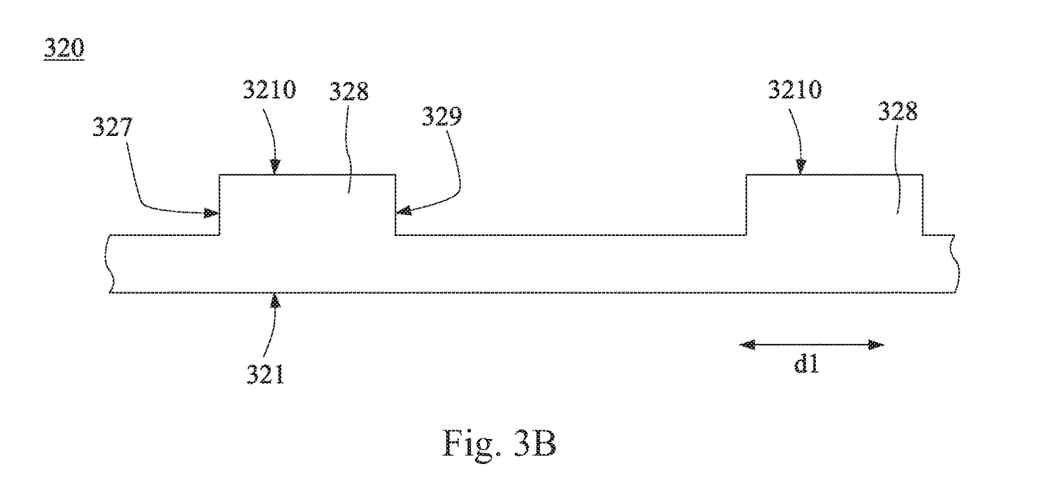
FIG. 3B is a schematic partial sectional view of a light guide plate taken along the first direction of yet another embodiment of the present disclosure.

On the other hand, in other embodiments, the second cutting tool can have a square contour, allowing the second molding trench formed on the processing plane 701 to have vertical sidewalls, so that the processed first substrate 700 can form similarity of the microstructure 328 described in FIG. 3B on bottom surface of a light guide plate by molding.

In another embodiment, the second cutting tool can have trapezoidal contour, allowing the second molding trench to have tilted sidewalls, so that the processed first substrate 700 can form similarity of the microstructure 228 described in FIG. 3A on bottom surface of a light guide plate by molding.

In another embodiment, during the second cutting tool cutting the second molding trench, the second cutting tool can increase cutting depth on the processing plane 701 along the second direction d2. In other words, while cutting the processing plane 701 along the path S2, the distance of the second cutting tool inserting into the processing plane can increase or decrease. By the aforementioned step, the processed first substrate 700 can form a similarity of the microstructure group 128Ga described in FIG. 1B on bottom surface of a light guide plate by molding.

In conclusion, the backlight module of the embodiment of the present disclosure, by prisms on the bottom surface of light guide plate, directivity of surface light source provided by backlight module can be enhanced. The bottom surface of the light guide surface further includes microstructure groups, which can further enhance uniformity of the foresaid surface light source, or even further enhance the directivity. The manufacturing method of the embodiment of the present disclosure can provide a light guide plate with prisms and microstructure groups.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module comprising:
a plurality of light-emitting devices; and
a light guide plate having a light-emitting surface, a bottom surface being disposed opposite to the light-emitting surface, a first light-receiving side connecting the light-emitting surface and the bottom surface, a plurality of prisms, and a plurality of microstructure groups,
wherein the light-emitting devices are disposed at the first light-receiving side along a first direction, and the prisms are disposed on the bottom surface, and each of the microstructure groups has a plurality of microstructures, and each of the microstructures is connected to two of the prisms, which are adjacently disposed, and the prisms extend along the first direction, and each of the microstructures has a ridgeline being parallel to a second direction, which is different from the first direction.

2. The backlight module of claim 1, wherein, on the second direction, a gap between every two of the ridgelines of the prisms adjacently disposed is from 55 micrometers to 65 micrometers.

3. The backlight module of claim 1, wherein the second direction is perpendicular to the first direction.

4. The backlight module of claim 1, wherein the ridgelines of the microstructures of each of the microstructure groups are arranged along a straight line.

5. The backlight module of claim 4, wherein, on the first direction, a gap between every two of the ridgelines of the microstructures adjacently disposed are from 10 micrometer to 150 micrometer.

6. The backlight module of claim 1, wherein each of the microstructures has a first plane, a second plane, and a third plane connecting the first plane and the second plane.

7. The backlight module of claim 6, wherein the first plane and the second plane are perpendicular to the light-emitting surface.

8. The backlight module of claim 1, wherein, in each of the microstructure groups, on normal direction of the light-emitting surface, height of the ridgeline of each of the microstructures is higher or lower than heights of two of the prisms adjacent to the microstructure.

9. The backlight module of claim 1, wherein, in each of the microstructure groups, on normal direction of the light-emitting surface, heights of the microstructures are increasing or decreasing along the first direction.

10. The backlight module of claim 1, wherein, in every two of the microstructure groups which are adjacently disposed, the microstructures of the microstructure group and the microstructures of the other microstructure group are arranged in an alternative manner.

11. The backlight module of claim 1, wherein, in each of the microstructure groups, some of the microstructures are connected to each other.

12. The backlight module of claim 1, wherein the light guide plate has a first area, a second area, and a third area, and distance between the first area and the first light-receiving side is less than distance between the third area and the first light-receiving side, and distance between the second area and the first light-receiving side is less than the distance between the third area and the first light-receiving side, and the second area is located between the first area and the third area, and a structural height ratio in the first area and a structural height ratio in the third area are less than a structural height ratio in the second area, and the structural height ratio is, in normal direction of the light-emitting surface, maximum value of ratios of height of each of the microstructures to heights of two of the prisms adjacent to the microstructure.

13. The backlight module of claim 1 further comprising:
a plurality of second light-emitting devices;
and the light guide plate further including a second light-receiving side connecting the light-emitting surface and the bottom surface, a first area, a second area, a third area, a fourth area, and a fifth area,
wherein the second light-receiving side is disposed opposite to the first light-receiving side, and the second light-emitting devices are disposed at the second light-receiving side along the first direction, and distance between the first area and the first light-receiving side is less than distance between the third area and the first light-receiving side, and the second area is located between the first area and the third area, and distance between the fifth area and the second light-receiving side is less than distance between the third area and the second light-receiving side, and the fourth area is located between the third area and the fifth area, a structural height ratio of the first area and a structural height ratio of the third area are less than a structural height ratio of the second area, and a structural height ratio of the fifth area and the structural height ratio of the third area are smaller than a structural height ratio of the fourth area, and the structural height ratio is, in normal direction of the light-emitting surface, maximum value of ratios of height of each of the microstructures to heights of two of the prisms adjacent to the microstructure.

* * * * *